UNITED STATES PATENT OFFICE.

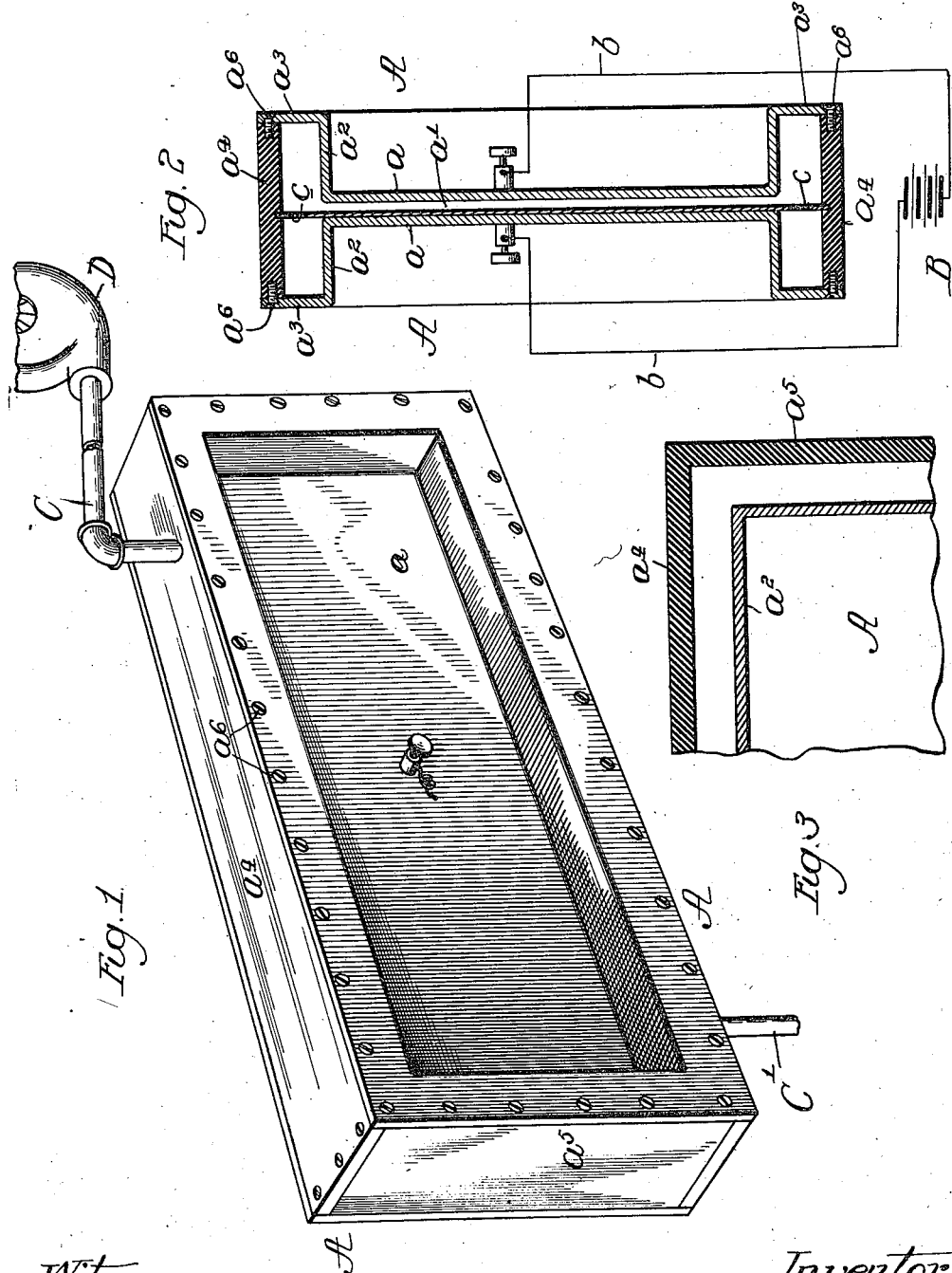

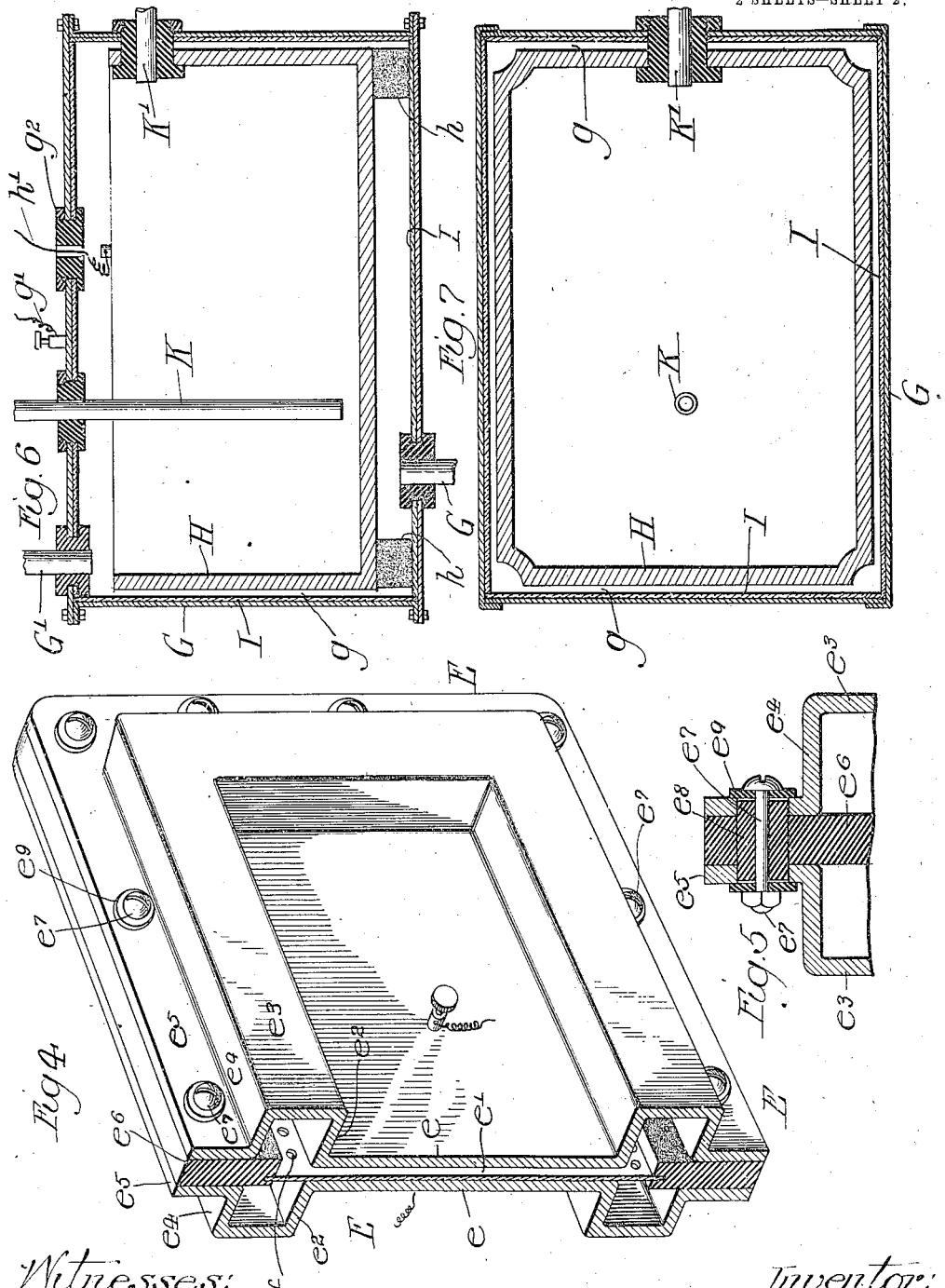

WILLIAM P. RICE, OF CHICAGO, ILLINOIS, ASSIGNOR TO THE NATIONAL OZONE COMPANY, OF CHICAGO, ILLINOIS, A CORPORATION OF ILLINOIS.

APPARATUS FOR PRODUCING OZONE.

No. 807,964.  Specification of Letters Patent.  Patented Dec. 19, 1905.

Application filed May 9, 1904. Serial No. 207,062.

*To all whom it may concern:*

Be it known that I, WILLIAM P. RICE, of Chicago, in the county of Cook and State of Illinois, have invented certain new and useful Improvements in Apparatus for Producing Ozone; and I do hereby declare that the following is a full, clear, and exact description thereof, reference being had to the accompanying drawings, and to the letters of reference marked thereon, which form a part of this specification.

This invention relates to improvements in apparatus for producing or generating ozone by the action of electric discharges through an oxygen mixture, the most prolific and economic source of which is found in atmospheric air; and among the objects of the invention is to produce an apparatus of this character by which ozone may be produced in abundant quantities at an economical expenditure of electrical power and with a minimum destructive effect of the heat produced by the electrical discharges.

The invention consists in the matters hereinafter set forth, and more particularly pointed out in the appended claims.

In an apparatus embodying my invention at least one, and preferably both, of the electrodes between which the electrical discharges take place is exposed to the direct influence of the atmosphere, whereby the heat generated by the electrical discharges is quickly absorbed and carried away, thereby preventing an undue heat in the air gap or space between the electrodes, through which the oxygen mixture is passed and in which the oxygen is acted upon to produce the ozone. Said electrodes preferably have the form of parallel flat metal plates of considerable superficial area, thereby affording a large exposure of one electrode to the other and a correspondingly wide area of air-gap through which the electrical discharge takes place. In the apparatus thus constructed the electrodes may be separated by a suitable dielectric, as glass, which in the form of the flat metal electrodes assumes the form of a sheet or plate of glass, thereby producing silent electrical discharges from one electrode to the other through the space between said electrodes, or the electrodes thus constructed or arranged may be used in connection with a Ruhmkorff coil or like device, the action of which produces the electrical discharge. The said plates may constitute the sides of a closed box, they being joined at their margins by insulating-strips, constituting the other sides of the box.

In the drawings, Figure 1 is a perspective view of one form of apparatus embodying my invention, the same having the form of an inclosure or box. Fig. 2 is a transverse section thereof. Fig. 3 is a fragmentary section of one corner of the apparatus or box. Fig. 4 is a partial fragmentary view of another form of apparatus adapted more especially for the production of ozone under pressure. Fig. 5 is a fragmentary sectional view showing the manner of connecting the two parts of the box or inclosure shown in Fig. 4. Fig. 6 is a vertical section of another form of box or inclosure. Fig. 7 is a horizontal view of the device shown in Fig. 6.

First referring to the construction shown in Figs. 1 to 3, inclusive, the device consists in general terms of a box composed principally of two thin metal plates A A, having central flat portions $a\ a$, which are parallel with each other and are separated by a narrow air-gap $a'$, through which the oxygen mixture is adapted to be passed and in which it is disintegrated to form ozone. Said plates are provided at their end and side margins with perpendicular oppositely-extending flanges $a^2\ a^2$, which latter are further provided with parallel flanges $a^3\ a^3$. $a^4\ a^5$ designate insulating-strips, which constitute the side and end walls of the box or inclosure and fill the space between and are fastened by screws $a^6$ to the margins of the parallel flanges $a^3$. The flanges $a^2\ a^3$ and the side and end insulating-strips $a^4\ a^5$ constitute walls of a continuous chamber or passage extending entirely around the box and surrounding and communicating with the air gap or space $a'$ between the central flat parts of the plates. The central part $a$ of the plates constitutes the effective part of the electrodes and are of opposite polarity, being connected with a battery B or other source of electrical energy through the medium of conductors $b\ b$. The electrical discharges take place between the flat parallel parts of the plates through the air-gap $a'$. As herein shown, the electrodes $a$ are separated from each other by means of a dielectric $c$, which in the present instance has the form of a flat sheet or plate of glass which lies against one of the electrodes and is fixed in place by being inserted at its margins in suitable grooves in the inner faces of the insulating side and end pieces $a^4$ $a^5$. Air is admitted to said box or inclosure through the medium of a pipe C and is discharged therefrom through the medium of a pipe C'. An air-forcing device D is indicated as connected with the inlet-pipe C and will be made of sufficient size to pass the required volume of air through the box. The pipe C' communicates with any suitable repository for the storage of the ozone or with a space into which it is adapted to be discharged for any useful purpose. In the form herein shown embodying the dielectric c the discharge of the current from one pole or electrode to the other is known as a "silent" discharge, and while passing through the oxygen mixture or air in the air-gap $a'$ acts upon the oxygen in a familiar manner to produce ozone, which is carried off through the pipe C'. In cases where a Ruhmkorff coil or like device be employed to produce the discharges the dielectric may be substantially modified.

It will be observed that both electrodes $a$ $a$ are exposed to the direct cooling action of the atmosphere, whereby said electrodes (which may be made quite thin) are maintained suitably cool notwithstanding the tendency to generate heat through the action of the electrical discharges. I am thus enabled to prevent such accumulation of heat in the air-gap of the inclosure as will be destructive to the production of the ozone. Moreover, by reason of the fact that said electrodes are made of considerable superficial area and are arranged with their flat faces parallel with each other the capacity of the device is greatly increased as compared to a device or apparatus employing electrodes in which the discharging areas thereof are much smaller—as, for instance, where the discharge takes place between the edges of such electrodes or the edge of one electrode and the side of another.

In Figs. 4 and 5 I have shown an apparatus made, essentially, like the apparatus heretofore described, with the exception that it is adapted to operate under greater pressure than the aforedescribed apparatus. In this construction, E E designate the side plates of a box or inclosure, of which the central depressed parts $e$ $e$ constitute the electrodes, which are separated by an air-gap $e'$. Said plates are provided with perpendicular oppositely-extending flanges $e^2$ and with parallel outwardly-extending flanges $e^3$ $e^3$, corresponding to the like flanges shown in the aforedescribed construction. The flanges $e^3$ are, however, provided with inwardly-turned flanges $e^4$, which are in turn provided with laterally-turned flanges $e^5$, located close together and separated by means of relatively thin insulating-strips $e^6$. The flanges $e^5$ are connected together and with the insulating-strips $e^6$ by means of bolts $e^7$. The strips constitute at once means for joining the plates E and for insulating them. Said bolts $e^7$, Fig. 5, extend through insulating-bushings $e^8$ in the openings in the flanges and through washers $e^9$ at each end of the bolts, which washers overlap the openings in said flanges $e^5$, whereby said flanges are insulated from the heads and nuts of said bolts. Said insulating-strips $e^6$ extend inwardly past the flanges $e^4$ of the box or inclosure, thereby preventing short-circuiting of the current between the flanges $e^4$. Said flanges $e^2$, $e^3$, and $e^4$ constitute a continuous passage or chamber extending entirely around the box and communicating with the air-space $e'$. $f$ designates a flat sheet-plate dielectric laid on one of the electrodes and extending between and entering at its margins grooves in the insulating-pieces $e^6$ in the same manner as described in the other figures. The operation of this form of apparatus is the same as the operation heretofore described, the only difference being that the construction of the box is such as to resist greater internal pressure than the first-described box, whereby the production of the ozone may be carried on under a substantial pressure.

In Figs. 6 and 7 is shown an apparatus consisting of an outer box G, which is inclosed on all sides, and an inner box H, which is open at its top. Said inner box is supported from the floor of the outer box on short insulating-posts $h$. The side and end walls of the box H are separated from the corresponding walls of the box G by narrow air-gaps $g$, and said side walls of the boxes G and H constitute the electrodes or poles of the apparatus and are connected with a source of electrical energy by conductors $g'$ $h'$. The conductor leading to the inner electrode extends through an insulating-bushing $g^2$ in the wall of the outer box. Glass plates I are fastened in any suitable manner to the inner faces of the walls of the box G and constitute the dielectrics. Air or other oxygen mixture is supplied to the apparatus through a supply-pipe G', opening through the top wall of the box G, and the ozone is discharged therefrom through an outlet-pipe $G^2$. The operation of this form of apparatus is substantially the same as in the form hereinbefore described and may be employed for the production of ozone under greater or less pressure, as desired. In this construction but one electrode—to wit, that constituted by the walls of the outer box G—is exposed directly to the air. The other electrode may be cooled by a body of liquid, which may be admitted thereto through a pipe K, extending downwardly through the top wall of the box G and into the open top of the inner box H and may be discharged therefrom through an overflow-pipe K'.

In all the various forms of the apparatus shown it will be observed that the plates constituting the electrodes are of such form that the discharging-surfaces thereof may be readily finished, as by a planing-machine, to produce smooth accurate surfaces. In cases where a positive flow of the oxygen mixture between the electrodes is not required the apparatus need not assume the form of a complete box or inclosure, and the electrodes may in such construction be supported so as to be held the proper distance apart in any suitable manner. While I have herein shown the electrodes as constituting integral parts of the plates that form walls of the inclosures or boxes, it is obvious that said electrodes may be made separate from such walls or supports and attached thereto in any suitable manner.

I claim as my invention—

1. In an apparatus for producing ozone a box, the opposing walls of which are thin and constitute the electrodes, and joined at their margins by insulating-strips in a manner to provide air-tight joints and to resist internal pressure, the whole constituting a closed box and a dielectric between the two electrodes, the outer sides of said electrodes being freely exposed to the atmosphere.

2. In an ozone-producing apparatus two thin, parallel, flat, metal plates constituting electrodes which are insulated from each other and separated by a narrow air-gap, and a flat dielectric fitted to one of said plates and extending at its margins beyond the parallel parts of said plates, the outer side of at least one of said plates being freely exposed to the surrounding atmosphere.

3. An ozone-producing apparatus consisting of a closed box embracing two flat metal plates having smooth opposing faces and constituting the electrodes, said electrodes being separated by a narrow air-gap, the outer sides of the plates being freely exposed to the surrounding atmosphere, the other walls of the box embracing strips of insulating material which are inserted between the edges of the plates and attached thereto in a manner to form air-tight joints, said box being provided with air inlet and outlet passages.

4. An ozone-producing apparatus comprising a closed box made to resist heavy internal pressure, and provided with an inlet and with an outlet, means for forcing air under pressure into and through said box, said box embracing two electrodes separated by a narrow air-gap, at least one of which is the outer wall of the box and freely exposed to the surrounding atmosphere.

5. An ozone-producing apparatus comprising a closed box made to resist heavy internal pressure, and provided with an inlet and with an outlet, means for forcing air under pressure into and through said box, said box comprising two electrodes separated by a narrow air-gap, at least one of which is the outer wall of the box and freely exposed to the surrounding atmosphere, and a dielectric interposed between said electrodes.

In testimony that I claim the foregoing as my invention I affix my signature, in presence of two witnesses, this 29th day of April, A. D. 1904.

WILLIAM P. RICE.

Witnesses:
WILLIAM L. HALL,
GERTRUDE BRYCE.